Inventor
William S. Norman, Jr.

By Mason, Fenwick & Lawrence
Attorneys

Patented Aug. 23, 1949

2,479,958

UNITED STATES PATENT OFFICE 2,479,958

TIRE TREAD

William Sutherlin Norman, Jr., Danville, Va.

Application May 19, 1948, Serial No. 27,913

9 Claims. (Cl. 152—209)

1

This invention relates to a tire tread and particularly to a tire tread having good traction in soft surfaces such as snow or mud, or on hard surfaced roads, while at the same time having long-life wearing characteristics on hard surfaced roads without excessive objectionable noise and vibrations.

There is no definite formula which can be followed in designing modern high speed pneumatic tire treads in order to accomplish the above results. Problems in the designs of tire treads of the present day tires which must operate during the major portion of their life on hard surfaced roads without excessive wear, but must have traction characteristic to enable them to operate efficiently in mud and snow, are entirely foreign to the problems encountered in making tire treads which were used almost exclusively on soft roadbeds where the primary objective was penetration into the roadbed surface.

The traction or skid resistance of a tire tread on hard surfaced roads, particularly when wet, is primarily dependent upon the total length of the edges of the traction elements which extend transversely of the tread and therefore the skid resistance of a tire under these circumstances is not necessarily increased by providing an "aggressive" tread of the prior art. By "aggressive tread design," is meant traction elements which project from the main body of the tire and usually take the form of large bars or traction blocks. Furthermore, an aggressive tread has very poor wearing characteristics and is very noisy when used on hard road surfaces. The noise characteristics, the wearing characteristics, and the non-skid or traction characteristics are so intertwined that it is very hard to isolate them in designing tire treads. In a tire tread of the type under consideration it is also necessary that it possess good self-cleaning characteristics; that is, the traction elements must be so arranged that in a normal operation of the tire tread the snow or mud will be expelled from between the traction elements in order not to interfere with the penetration of these traction elements into the soft surface over which the tire is operating. Also, generally speaking, the greater the discontinuity of any portion of the tire tread, the greater will be the noise and the wear. The prior art is full of all kinds of proposed tread designs, both aggressive and non-aggressive, most of which have never been used because of the practical objections from the standpoint mentioned above.

The present invention provides a tire tread which overcomes to a very great extent all of the disadvantages of prior snow and mud tire treads while at the same time provides a tire tread having good self-cleaning characteristics. This tire has been found to be highly efficient under actual operating conditions. The invention, in its broadest aspects, provides a tire tread having a plurality of circumferentially extending groups of traction elements which are separated by relatively narrow transverse grooves. The width of the grooves are preferably so related to the circumference of the tire that they provide the necessary "biting" or penetrating action into the soft snow or mud and also permit a localized flexing of a tire which enhances the self-cleaning feature without at the same time seriously effecting the wearing characteristics of the tread or producing excessive noise and vibration.

Accordingly, the primary object of the present invention is the provision for an improved tire tread which has good traction in soft surfaces such as snow or mud or on hard surfaced roads, while at the same time having good wearing characteristics on hard surfaced roads without objectionable noise and vibration.

Another object is to provide a tire of the type described which will also have good self-cleaning characteristics which enhances the traction in soft surfaces such as snow and mud.

Other and further objects will become readily apparent from the following description when considered in connection with the accompanying drawings, illustrating an embodiment of the invention, and in which.

Figures 1, 2, 3:
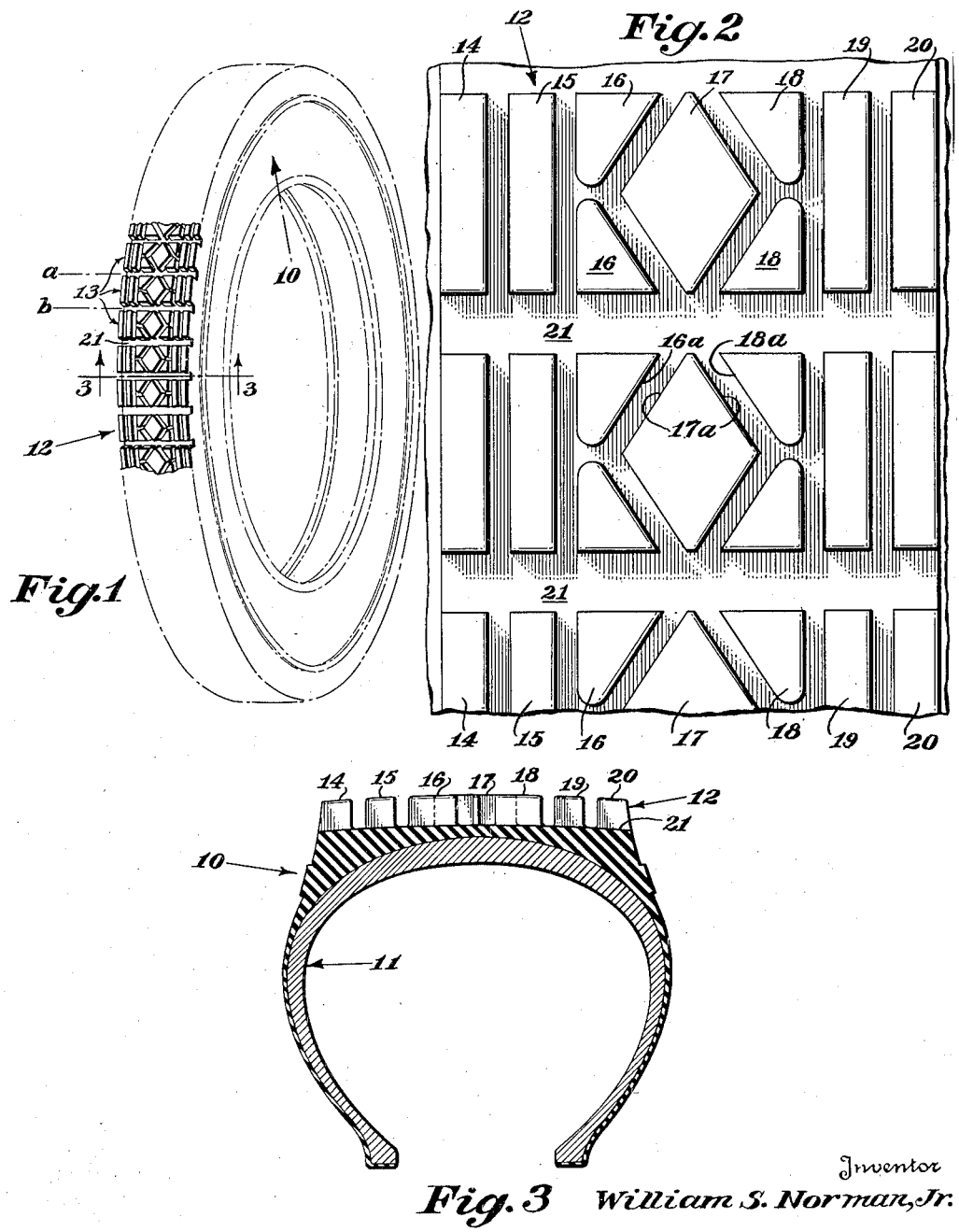
Figure 1 is a partial perspective of a tire tread in accordance with the present invention.
Figure 2 is an enlarged end-on view showing the arrangement of the traction elements of the tread shown in Figure 1.
Figure 3 is a cross section of a tire embodying the present invention.

Referring to the drawings, an embodiment of the present invention is shown as applied to a tire casing 10 having the usual fabric reenforced body 11 and tread portion 12. It will be readily understood that a tread in accordance with the present invention may be applied to new tires or may be applied by the conventional retreading or recapping techniques.

The tread 12 comprises a plurality of circumferentially extending groups 13 of traction elements 14, 15, 16, 17, 18, 19 and 20. By "circumferentially extending groups" is meant, for example, the traction elements between the transverse grooves 21, the center lines of which are indicated by the letters a and b. The traction elements 14, 15, 16, 17, 18, 19 and 20 in the embodiment shown are polygonal in shape. The elements 14, 15 and 19, 20 adjacent the shoulders of the tire are in the form of rectangles which are long as compared to their width and to their relative spacing. In effect these elements constitute circumferential ribs which are interrupted by the transverse grooves 21. The diamond shaped elements 17 in the central portion of the tread are flanked on the four sides by spaced quarter-diamond shaped elements 16 and 18 which are spaced therefrom sufficiently to facilitate the penetration of the tread into snow or mud. It will be noted that the elements in the individual groups are in overlapped relation so that the traction elements as a group provide a substantially continuous bearing surface. For instance, it will be noted that the centrally disposed diamond elements 17 as well as the lateral rib elements 14, 15 and 19, 20 extend the full length of the circumferential group while the ends of the quarter-diamonds are disposed adjacent the transverse center line of the diamond elements 17 but are in circumferentially spaced relation. It will be apparent from this that the ends of all the traction elements adjacent the transverse grooves 21 present sharp edges which provide the tire with the penetration characteristic for "biting" into snow or mud and at the same time provide transverse edges which produce the necessary wiping action to accomplish traction or skid resistance on wet hard surfaced pavements. It will also be apparent that the inclined edges of the diamonds and quarter-diamonds provide additional edges which have transverse components 16a, 17a and 18a, which provide the tread with adequate traction characteristics on the portion of the tire between the circumferentially spaced grooves 21. In this way the tire tread is provided with substantially continuous traction edges for wet pavement, which is a very important characteristic. These continuous traction edges for providing skid resistance on wet pavements are provided notwithstanding the fact that in effect the center portion of the tread surface is provided with a substantially continuous bearing surface. The continuous bearing surface is important in that it reduces the wear on the tread.

As will be readily apparent from Figure 3, a tire made in accordance with the present invention preferably has a substantially flattened cross section which provides the very heavy shoulders on the tire tread. These heavy shoulders tend to stiffen the body or carcass of the tire and also, due to the flattened contour of the tread, when supported by the air chamber of the tire, cause a somewhat greater load to be carried at the shoulders, thus increasing the penetrating action of the shoulder traction elements to increase the lateral skid resistance in soft mud or snow. Also, due to the configuration of the tire, there will be a tendency for the central portion of the tread to flex inwardly as the weight of the vehicle comes on to the successive portions of the tire as it rolls in contact with the road surface. Any such flexing of the central portion of the tire will obviously have a tendency to close the grooves between the edges of the different traction elements so that as the successive portions of the tire come into contact with the snow and mud they are in effect slightly reduced in size. As they penetrate into the snow or mud these grooves will be filled, and then as the tire continues to roll as the weight comes off of the successive portions of the tire, those portions will return to their normal shape and the grooves will increase slightly in width at least at the outer surface of the tread, so that the mud or snow will have a tendency to leave the grooves under the action of gravity or under the action of centrifugal force. This provides a tire with a very important self-cleaning feature which is enhanced by the transverse grooves 21 which contribute to the flexibility of the tire on the spaced transverse axes. It will be understood that similar contracting and expanding action of the sides of the grooves 21 will take place as the tire rolls in contact with the road surface. It will be readily understood that the flexing of the tire will also have a similar effect on the width of the circumferential grooves between the shoulder traction elements 14, 15 and 19, 20. The flexing of the successive portions of a pneumatic tire as it rolls in contact with the road surface may be likened to a "breathing action" which, if utilized in conjunction with the arrangement of the tread elements, provides improved traction characteristics. It will be apparent that the configuration of the embodiment shown which contributes to the "breathing action" of the tire tread, will enhance the self-cleaning action of all portions of the tread.

Although a specific tread has been shown and described herein, it should be understood that the invention is not limited to the exact shape and arrangement of the tread elements shown. For instance, instead of the diamonds and quarter-diamonds shown, the central portion of the tread might be provided with any suitable traction elements which provide a substantially continuous tread supporting surface for that portion of the tread so long as adequate spacing is provided between the traction elements to take advantage of the "breathing action" of the tire. For instance, the central traction elements might be in the form of round buttons which are properly overlapped circumferentially. Also, the traction elements might comprise a plurality of circumferentially extending rib sections having lateral projections such as the common saw tooth configurations, without departing from the spirit or scope of the present invention.

The essential feature of the invention as pointed out above, resides in the arrangement of the traction elements to take advantage of the "breathing action" of the tire in order to obtain the proper self-cleaning action. Tires made in accordance with this invention have been subjected to very severe use under snow and ice conditions and have been found to give extraordinary traction under these conditions, while at the same time not developing excessive noise and vibration when operated on hard surfaced roads.

It is not intended that the present invention be limited to the specific dimensions of the traction elements although a highly successful 6.00 x 16 tire has been provided in which the shoulder ribs 14, 15 and 19, 20 were approximately three-quarters of an inch in width and which were separated by grooves of approximately three-sixteenths of an inch in width; the maximum transverse dimension between the points of the diamonds 17 being approximately one and one-eighth inches and the length of a group and consequently the circumferential extent of the diamond being approximately one and five-eighths inches from edge to edge of the adjacent transverse grooves. The transverse grooves in that specific example were approximately one-half inch in width and the spacing between the edges of the diamonds and the quarter-diamonds being approximately five-thirty-seconds of an inch and the total transverse width of the tire measured between the outside edges of the shoulder ribs being approximately four and one-eighth inches.

Although the invention has been described in considerable detail, it will be apparent to those skilled in the art that many variations are possible without departing from the inventive concept. It is therefore desired that the invention not be limited except insofar as is made necessary by the prior art and by the appended claims.

I claim:

1. A tire construction comprising a tread portion formed with a plurality of circumferentially extending groups of traction elements, said groups being separated by transversely extending grooves and said traction elements being transversely spaced with the intervening spaces or grooves opening into said transverse grooves to facilitate localized flexing of said tread which in turn enhances the self-cleaning action of said tread.

2. A tire construction comprising a tread portion formed with a plurality of circumferentially extending groups of traction elements, said groups being separated by transversely extending grooves and some of said traction elements circumferentially overlapping, and all of said elements being transversely spaced with the intervening spaces or grooves opening into said transverse grooves, to facilitate localized flexing of said tread which in turn enhances the self-cleaning action of said tread.

3. A tire construction comprising a tread portion formed with a plurality of circumferentially extending groups of traction elements, said groups being separated by transversely extending grooves, some of said traction elements extending over only a portion of the circumferential extent of said groups, all of said traction elements being spaced transversely with the intervening spaces or grooves opening into said transverse grooves to facilitate localized flexing or breathing of said tread which in turn enhances the self-cleaning action of said tread.

4. A tire construction comprising a tread portion formed with a plurality of circumferentially extending groups of traction elements, said groups being separated by transversely extending grooves, the traction elements at the sides of said treads comprising portions of circumferentially extending ribs to provide lateral skid resistance to said tread, the central portion of said tread comprising separated traction elements overlapping in a circumferential direction but spaced in a transverse direction with the intervening spaces or grooves opening into said transverse grooves to facilitate the cleaning action of said tread.

5. A tire construction comprising a tread portion formed with a plurality of circumferentially extending groups of traction elements, said groups being separated by transversely extending grooves, the traction elements at the opposite sides of said tread comprising circumferentially extending ribs interrupted by said transverse grooves to provide lateral skid resistance for said tread, the traction elements in the central portion of said tread overlapping in a circumferential direction and having traction edges inclined to said transverse grooves and to the central plane of said tire, the intervening spaces or grooves between all of said traction elements opening into said transverse grooves to facilitate the cleaning action of said tire.

6. A pneumatic tire construction comprising a fabric reenforced body or carcass constituting a pneumatic chamber, a tread portion having its outer surface adjacent the shoulder of said tread spaced from said carcass a greater distance than at the central portion of said tread, said portion formed with a plurality of circumferentially extending groups of traction elements, said groups being separated by transversely extending grooves, the traction elements adjacent said shoulders being in the form of circumferentially extending ribs interrupted by said transverse grooves, the traction elements in the center portion of said tread being overlapped in a circumferential direction and transversely spaced, the intervening spaces or grooves between all of said traction elements opening into said transverse grooves to facilitate the cleaning action of said tread.

7. A tire tread formed with a plurality of circumferentially extending groups of traction elements, said groups being separated by transversely extending grooves and some of said traction elements circumferentially overlapping and all of said elements being transversely spaced with the intervening spaces or grooves opening into said transverse grooves to facilitate localized flexing of said tread.

8. A tire tread as claimed in claim 7 in which said transverse grooves are substantially twice as wide as the spacing between said traction elements.

9. A tire tread as claimed in claim 7 in which the spacing between said traction elements is small as compared to the width of said transverse grooves.

WILLIAM SUTHERLIN NORMAN, Jr.

REFERENCES CITED

The following references are of record in the file of this patent:

UNITED STATES PATENTS

| Number | Name | Date |
|---|---|---|
| D. 56,616 | Hufford | Nov. 16, 1920 |
| 1,413,190 | Rapson | Apr. 18, 1922 |